(12) United States Patent
Mezzalira

(10) Patent No.: US 7,108,018 B1
(45) Date of Patent: Sep. 19, 2006

(54) REINFORCED FLEXIBLE HOSE

(75) Inventor: Rinaldo Mezzalira, Arcugnano (IT)

(73) Assignee: Eurocondotte, S.p.A., Vicenza (IT)

( * ) Notice: Subject to any disclaimer, the term of this patent is extended or adjusted under 35 U.S.C. 154(b) by 30 days.

(21) Appl. No.: 10/009,712

(22) PCT Filed: Jun. 10, 2000

(86) PCT No.: PCT/IB00/00778

§ 371 (c)(1),
(2), (4) Date: Dec. 7, 2001

(87) PCT Pub. No.: WO00/77433

PCT Pub. Date: Dec. 21, 2000

(30) Foreign Application Priority Data

Jun. 10, 1999 (IT) .............................. VI99A0120

(51) Int. Cl.
*F16L 11/08* (2006.01)
(52) U.S. Cl. ...................... 138/109; 138/125
(58) Field of Classification Search ................ 138/109, 138/104, 125; 428/36.91
See application file for complete search history.

(56) References Cited

U.S. PATENT DOCUMENTS

| | | | | | |
|---|---|---|---|---|---|
| 2,901,024 | A | * | 8/1959 | Marsden, Jr. ................ | 156/143 |
| 3,388,932 | A | * | 6/1968 | Bradley ........................ | 285/332 |
| 3,920,049 | A | * | 11/1975 | Lippert et al. ............... | 138/109 |
| 3,977,440 | A | * | 8/1976 | Phillippi ...................... | 138/125 |
| 4,148,342 | A | * | 4/1979 | Welsby ........................ | 138/109 |
| 4,366,842 | A | * | 1/1983 | Peavy et al. ................. | 138/109 |
| 4,495,134 | A | * | 1/1985 | Ouchi et al. ................. | 264/516 |
| 4,523,141 | A | * | 6/1985 | Thomas et al. .............. | 324/557 |
| 4,926,909 | A | * | 5/1990 | Salinas ........................ | 138/109 |
| 5,332,160 | A | * | 7/1994 | Ruskin ........................ | 239/542 |
| 5,352,309 | A | * | 10/1994 | Oswald ........................ | 156/154 |
| 5,588,468 | A | * | 12/1996 | Pfleger ........................ | 138/121 |
| 5,690,146 | A | * | 11/1997 | Stammen ..................... | 138/36 |
| 5,704,401 | A | * | 1/1998 | Fukui et al. ................. | 138/121 |
| 5,851,203 | A | * | 12/1998 | van Muiden ................ | 604/525 |
| 6,041,827 | A | * | 3/2000 | Takahashi et al. .......... | 138/139 |
| 6,123,111 | A | * | 9/2000 | Nathan et al. ............... | 138/109 |
| 6,305,423 | B1 | * | 10/2001 | De Meyer et al. ........... | 138/33 |
| 6,616,996 | B1 | * | 9/2003 | Keith et al. ................. | 428/35.8 |

FOREIGN PATENT DOCUMENTS

EP 0118613 * 11/1986

* cited by examiner

*Primary Examiner*—James Hook
(74) *Attorney, Agent, or Firm*—R Neil Sudol; Henry D. Coleman; William J. Sapone

(57) ABSTRACT

A reinforced flexible hose comprising as least a first inner extruded tubular layer and at least a second extruded tubular layer with a tubular reinforcement fabric provided between said first and second hoses. The two tubes are joined so as to form a homogeneous unit by their mutual contact surfaces, by gluing or molecular adhesion, for example. The end portion of the hose increases in width so much as to make it possible to achieve a better mechanical hold with the standard junctions to which it is bound to be fixed. The thickness increases at the end portions may either be constant along its whole length, or start gradually toward the end.

9 Claims, 3 Drawing Sheets

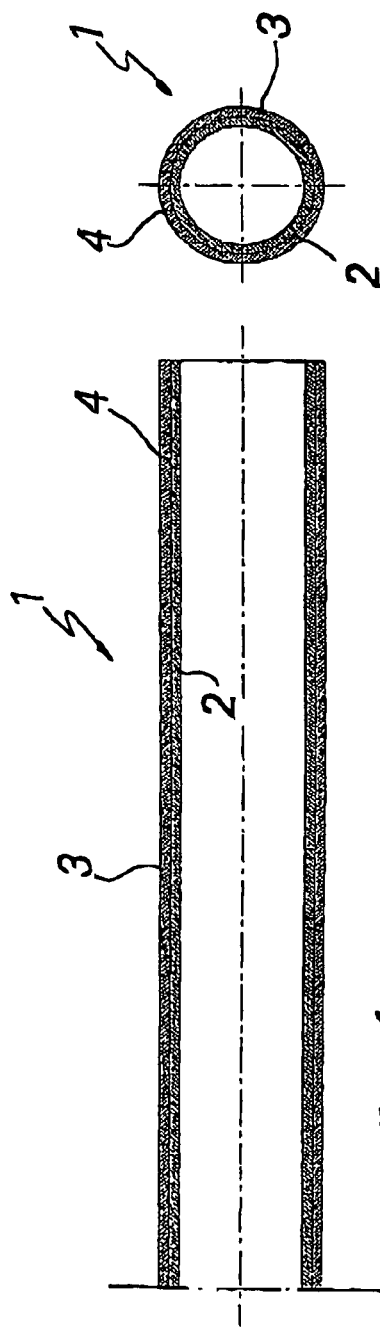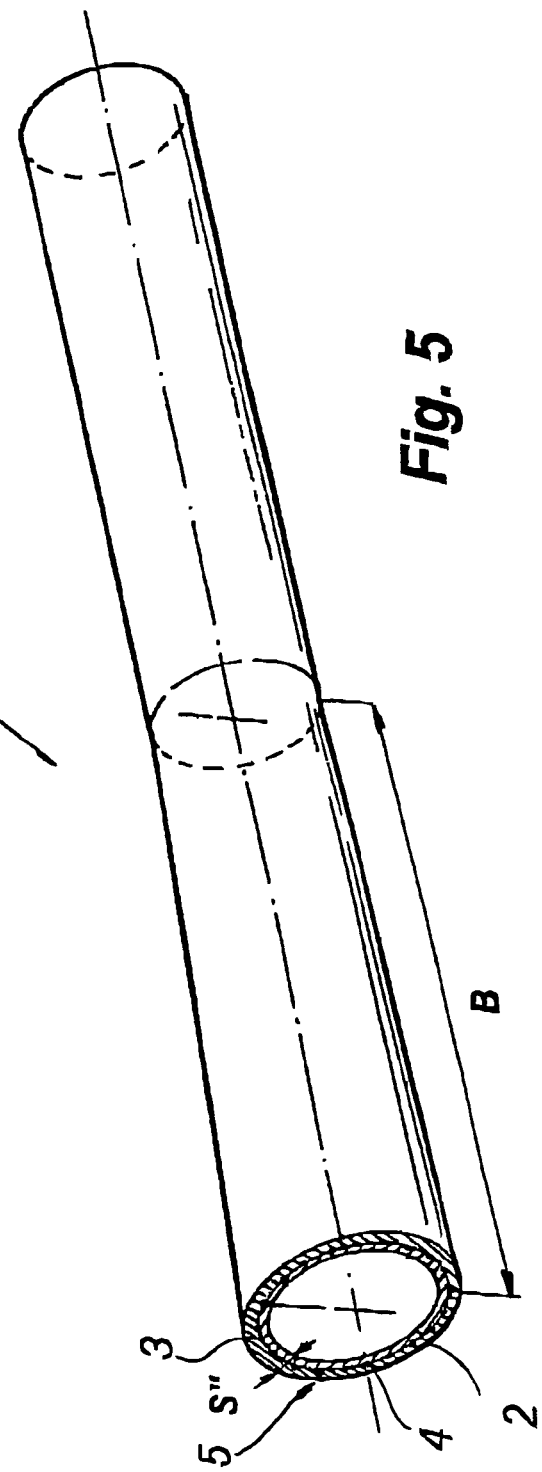
Fig. 1
Fig. 2
Fig. 5

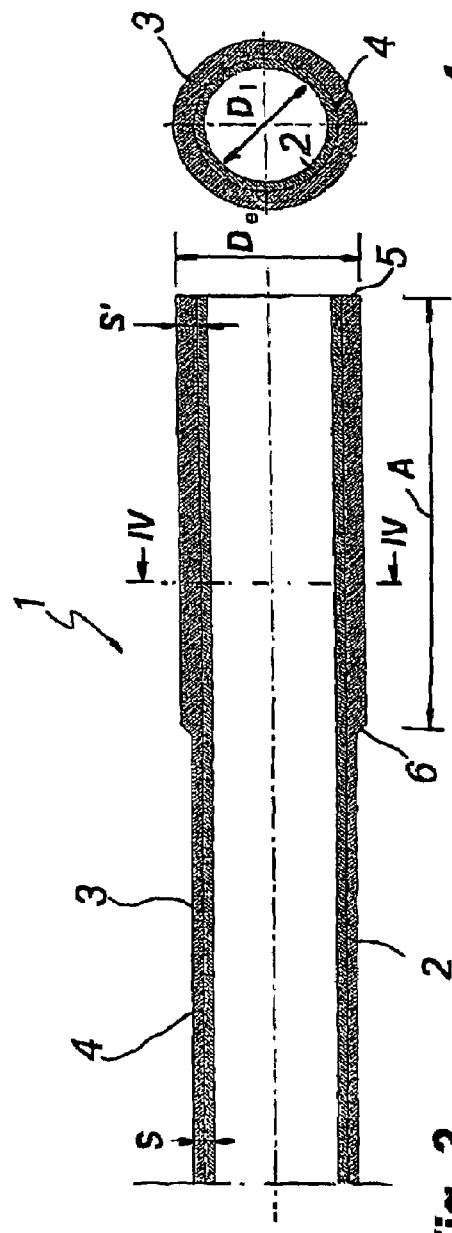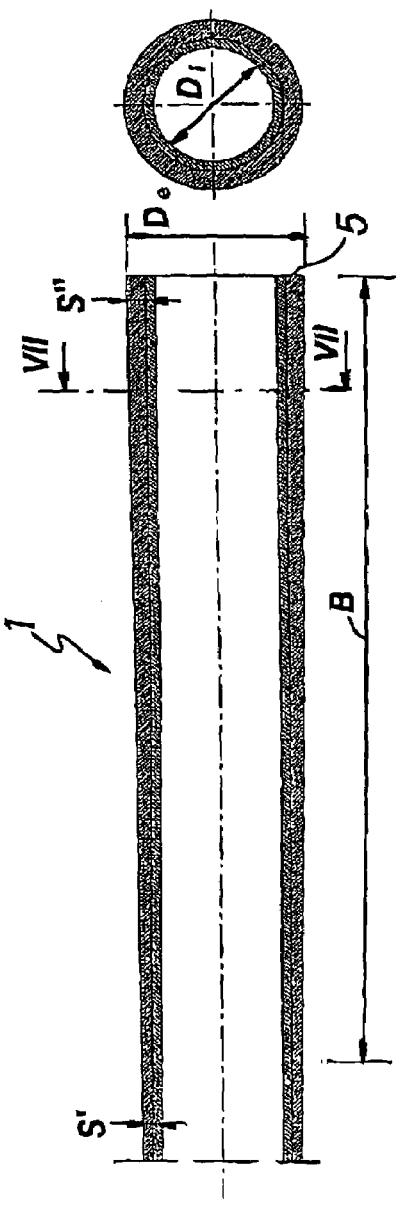

REINFORCED FLEXIBLE HOSE

FIELD OF THE INVENTION

The present invention relates to a reinforced flexible hose, particularly but not exclusively suitable for the field of gardening.

BACKGROUND OF THE INVENTION

Flexible hoses are known which belong to the cheap category of the market. In order to control production costs, these are produced joining two coaxial tubular layers having reduced thickness, by means of the insertion of a knitted or woven reinforcement therebetween.

The above mentioned types of hoses are usually employed in connection with mounts, joints or irrigation tools having standard size and manufactured on a mass scale. Tubes having a reduced thickness are hard to join to the standard quick-fit joints, therefore a short while after the hose starts being used, water leaks are often found to occur through the joining area.

A further disadvantage of said known hoses is that they are prone to be easily twisted and damaged where they connect with the joint, most often in proximity of the water mains tap.

Several attempts to overcome the above shortcomings were made in the past, for instance fixing joints that are pressed and made to be suitable for the hose either at the production stage or resorting to hose joints to be fixed between the hose and the standard joint, said hose joints being made of a similar material to that the tube is made of and further being suitably secured.

Although on the one hand the above solutions lead to a reinforcement of the hose wall, thus making its bending more difficult, on the other hand they bring about an increase in production costs, that makes them not too favourably welcomed by the users of this specific market.

A further disadvantage is that in case the hose breaks and is subject to shortening at its end portions, it turns out to be mandatory to use standard joints that have the known sealing problems deriving torn the difficulty there is to find special joints distributed by the normal large-scale retail trade.

In case reinforcements are made by hose joints, it is likewise difficult to find spare hose joints to replace those that cannot be recovered after a damaged hose has been shortened.

EP-A-0 118 613 discloses a flexible hose for shower and sanitary fixtures having all the features mentioned in the preamble of the attached claim 1. However, the thickness of one of the inner and outer layers is increased gradually and in a linear way and is not constant along the whole extension of longitudinal end portions. Thus, the end portion with increased thickness must have a relatively long extension in order to provide a sufficient resistance for the joints.

SUMMARY OF THE INVENTION

A primary object of the present invention is to provide a new type of hose that is capable of being easily and effectively joined to the standard joints, in so doing maintaining its enhanced sealing properties and avoiding water leaks, while retaining its cost effectiveness at the production stage and remaining comprised in the low-cost category on the market.

A further specific object of the present invention is to design a hose of the type outlined above that features a structure that is capable of minimising the risks of breakage, twisting or detachment at the joining with the tap or with the watering tool.

The above objects are accomplished by providing a reinforced flexible hose that comprises in accordance with the attached claim 1 is characterised in that the increased thickness is substantially constant along the whole extension of the longitudinal portions and in that the thickness increase is non-linear towards the free end of said longitudinal portions.

Thank to said reinforcements, it is thus possible to use joints of the standard type, maintaining a mechanical connection at the reinforced end of the hose, preventing the hose to detach from the joint and reducing the danger of twisting the end portion thereof during handling by the user.

A further object of the present invention is to provide a simple method for the production of a hose according to the present invention, that allows the production of great quantities thereof on a continuous basis at low costs, by using the existing equipment, though suitably modified for that purpose.

The above object is accomplished by providing a method for the production of a reinforced flexible hose that in accordance with the attached claim 9 comprises the following steps:

a) extruding at least one first inner tubular layer (2) made of plastic material having a substantially constant advancement speed (V);

b) weaving a textile fabrics material (4) onto the outer surface of said first layer (3), at the same advancement speed (V);

c) extruding at least one second tubular layer (2) made of plastic material at substantially the same advancement speed (V) of said first layer (2) and said tubular reinforcement (4) so as to allow a homogeneous fitting of said layers (2, 3) and form a wall having a predetermined thickness (S);

d) providing longitudinal portions (A, B) having an increased thickness (S', S'') in said first and/or second tubular layer (2,3) so as to enhance resistance of the hose in order to favour a stable mating to hose end joints or to other irrigation accessories;

e) cutting the hose in correspondence of said longitudinal portions (A,B) having increased thickness, characterised in that said increased thickness is made substantially constant along the whole extension (A) of said longitudinal portions and with non-linear increase towards the free end of said longitudinal portions, Step d) can be accomplished by varying the advancement speed of at least one of the said layers in correspondence at said longitudinal portions thereof having greater thickness. The speed change can be accomplished instantaneously, then the speed is kept at a constant value for a portion of its length.

As an alternative, step d) can also be accomplished by varying the flow of the extruded material having increased thickness.

The finished hose alternatively features end-longitudinal portions having increased thickness and being frusto-conically shaped as with their larger side in common, or it may otherwise feature a cylindrically shaped thicker portion.

At the end of the process, the hose is cut in correspondence of the section having maximum diameter or of the middle area of the portion having increased thickness.

BRIEF DESCRIPTION OF THE DRAWINGS

Further features and advantages of the present invention will be more clearly apparent in the light of the following description of a preferred but not exclusive embodiment, given by way of not limiting example, of a reinforced flexible hose illustrated in the attached drawings, wherein:

FIG. 1 shows a longitudinal section view of the hose of the prior art,

FIG. 2 is a cross-sectional view of the hose shown in FIG. 1;

FIG. 3 is a general perspective view of an embodiment of the reinforced flexible hose according to the present invention;

FIG. 4 is a longitudinal sectional view of a first embodiment of the present invention;

FIG. 5 is a general perspective view of a second embodiment of the reinforced flexible hose according to the present invention;

FIG. 6 is a cross sectional view of the embodiment of flexible hose shown in FIG. 5;

FIG. 7 is a cross sectional view of the hose shown in FIG. 6;

DESCRIPTION OF SOME PREFERRED FORMS OF EMBODIMENT

Figure 8:
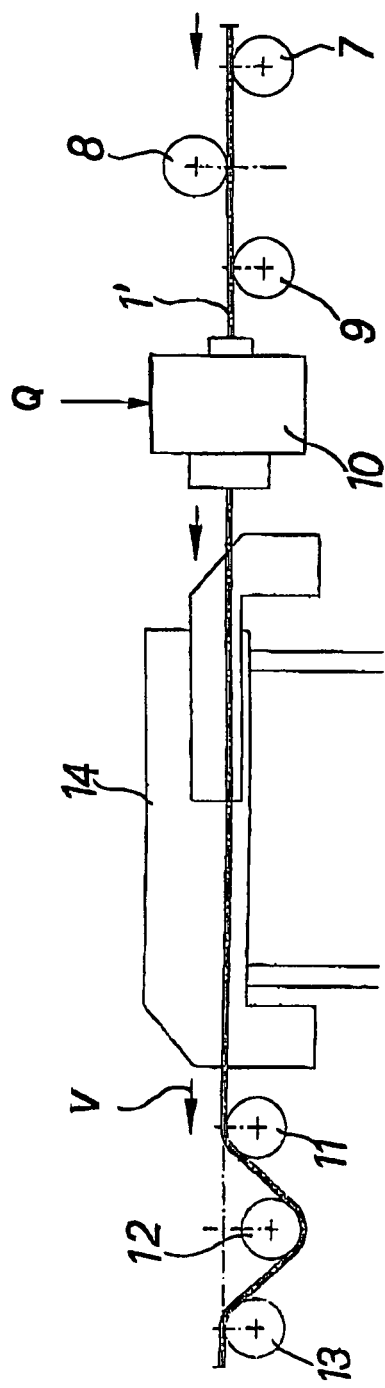
FIG. 8 is a schematic side view of a device for the production of a hose according to the present invention, with said device in a first operating position.

With reference to FIGS. 1 and 2 a flexible hose of the prior art is shown, generally indicated with the reference numeral 1, that is essentially formed by two tubular coaxial layers, respectively an inner layer having an inner diameter Di and an outer layer having an outer diameter De, and with a tubular reinforcement or stock 4 made of fibrous material, of the woven or knitted type, that is interposed between the two layers 2, 3 and extends over the entire length thereof.

Layers 2, 3 are made of extruded plastic materials and are mutually joined in correspondence of their mutual contact surface with the interposition of reinforcement 4 so as to form a wall having an overall thickness S that is substantially constant, except the working tolerances connected with the extrusion of layers with the weaving of the reinforcement fabrics 4.

FIGS. 3 and 4 show a first embodiment of hose 1 according to the present invention, said hose having a thickness S' along a portion A of its length starting at one end 5, said thickness being increased with respect to thickness S of the portion of hose 1 that is the furthest from its end 5.

In this first embodiment, tube wall 1 has either a substantially constant thickness along the whole portion A past circular step 6 or an extremely short conical connecting portion. Thus it will be possible to promote a stable watertight mating with connecting organs or gardening hose joints, thereby avoiding water leakages and any sort of breakages at those hose joints.

According to a second embodiment of the reinforced flexible hose of the present invention, illustrated by FIGS. 4, 5 and 6, the increase in thickness of the hose wall is accomplished by a gradual increase in thickness of the outer layer 3 starting from point 6 where the wall has a thickness that is equal to the average is normal thickness S. Therefore thickness increases in a linear fashion until it reaches a maximum value S" in correspondence of end 5. This is accomplished by means of an increase in thickness limited to the outer layer 3.

In general, longitudinal portions A and B having increased thickness allow the accomplishment of a stable mechanical grip with standard joints or irrigation tools and accessories of the threaded ferrule type, that has an enhanced mechanical and hydraulic resistance where the hose has a greater thickness.

In view of the fact that the greatest stresses caused by the user's handling are localised where the joints are coupled to the hose, the reinforcement according to the present invention brings about a reduction in the ease with which the hose bends and twists, with a further advantage for the user.

Layers 2, 3 that form the hose can be made of the same or of different materials, in accordance with the technical and aesthetic requirements to be met. The inner tubular layer can for instance be made of a material that is suitable for allowing contact with food or beverage products without releasing dangerous or harmful particles, whereas the outer layer can be made of a less noble material that is very unsuitable for alimentary use.

It is also possible td envisage further outer layers or films made of materials with anti-abrasive properties, or likewise being shielding against ultraviolet (UV) radiation, that have purely ornamental and aesthetic, with various different uniform or patterned colourings and pigmentations.

According to the present invention, reinforcement 4 can also be laid over exclusively one extruded tubular layer rather than being interposed between two co-extruded layers, if and whenever appropriate.

Furthermore it is possible to form the increased thickness exclusively on the inner tubular layer 2, as well as it is possible to provide the increased thickness of both layers in correspondence of the same area.

Figure 9:
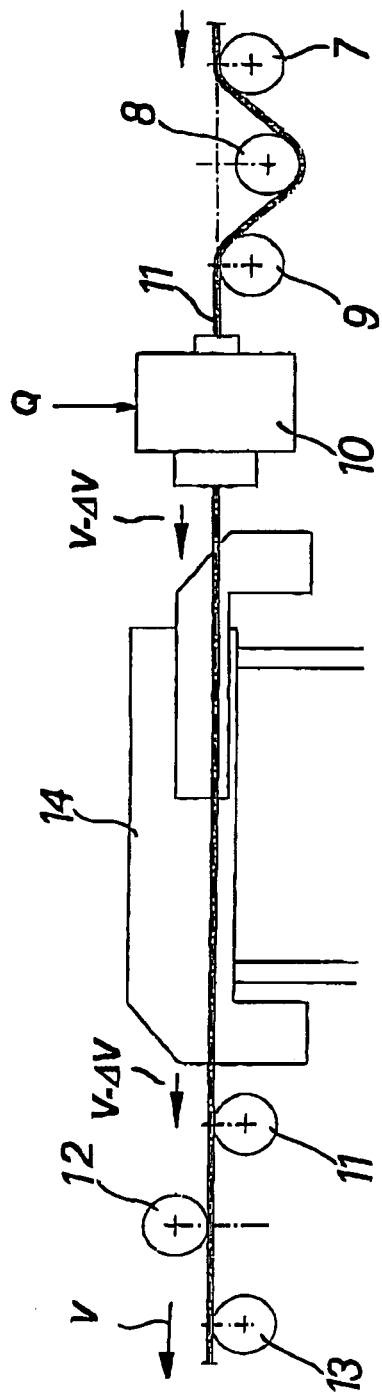
FIG. 9 is a schematic side view of the device shown in FIG. 8, with said device in a second operating phase.

In FIGS. 8 and 9 a machine for the production of a plastic hose extrusion according to the present invention is schematically depicted, that is part of a full production line for the flexible hose.

In FIG. 8 an intermediate product is shown and indicated with the reference numeral 11 said product consisting of the inner tubular layer 2, whereon the woven or knitted tubular reinforcement fabric 4 is formed.

The semi-finished product 1' is guided by rollers 7, 8, 9 up to an extrusion head 10 that forms the outer tubular layer 3 coaxially to the product 1'. For a first embodiment, the flow Q of the material extruded from head 10 is constant and the thickness of the extruded tubular layer 3 deposited around product 1' depends on its advancement speed V within head 10. Advancement speed V of finished tube 1 is generally constant at the very end of the production process, therefore a decrease $\Delta V$ in the speed is accomplished combining the actuation of roller groups 7, 8 and 9 and 11, 12, 13 accompanying the hose. In particular, moving downwards the roller 8 located upstream of the extrusion head 10 and moving upwards the roller 12 located downstream of the extrusion head 10, until positioning them as shown in FIG. 9, the length of the path the tube must move along is varied, thereby reducing its velocity from V to V−$\Delta V$ in correspondence with head 10.

A change in speed $\Delta V$ can then be accomplished either gradually or instantaneously, depending on the configuration the portion with increased thickness must have. Applying a suitable algorithm to the change in advancement speed, end portions with an increased thickness can be shaped is differently.

In a second embodiment of the production method according to the present invention, it is possible to accomplish an increase in thickness by a variation ΔQ of extruded material flow Q, deposited by the extrusion head 10.

Downstream of the extrusion head 10 there may also be provided a container 14 wherein the finished hose 1 that is still warm can be subjected to further working process, or be simply allowed to cool down.

The production of the hose is carried out on a continuous basis and the length of the end portions where the increased thickness of the hose wall are formed is defined as a function of the overall length of the hose to be produced. When the production of a first batch is over, the segments of hose are severed at the middle point of their thickened portion. In order to identify the point where the tube is to be cut, the pigmentation and colouring of the outer layer of the finished hose may be varied. Such pigmentation and colour May be varied along the end portions in order to produce hoses having longitudinal portions with a different colour, so as to easily highlight the area where variations in thickness occur. To this end, it is likewise possible to carry out the injection of pigmented material having different colours through head 10.

The overall colouring of the hose, that is of its outer layer, and possibly as well as of the woven reinforcement fabrics can be accomplished with materials that are either uniformly coloured or that are striped, using the same or different colours. Colour combinations are also possible in so doing obtaining a wide range of aesthetic, optical and visual effects.

The invention claimed is:

1. Multiple layer reinforced flexible hose comprising at least one inner tubular first layer made of extruded plastic material, at least one outer tubular second layer made of extruded plastic material, a tubular reinforcement made of a textile material interposed between said first and said second layer, said first and said second layer extending over substantially the entire length of said tubular reinforcement and being homogeneously joined in correspondence of their mutual contact surface so as to define a wall having an overall predetermined thickness, an end portion of said wall having an increased thickness along a longitudinal portion of predetermined extension to thereby provide watertight sealing action with external connection organs, wherein said increased thickness is substantially constant along the whole extension of each said longitudinal portion and a non-linear, stepped increase with respect to the rest of the hose, said end portion with said increased thickness having a substantially constant outer diameter and a smooth and continuous outer surface without discontinuities over an entire length of said end portion, said stepped increase being of substantially circular shape.

2. Reinforced flexible hose according to claim 1 wherein said stepped increase has a substantially short conical shape.

3. Reinforced flexible hose according to claim 1 wherein said increased thickness is only localized on said outer tubular layer.

4. Reinforced flexible hose according to claim 1 wherein said increased thickness is only localized on said inner tubular layer.

5. Reinforced flexible hose according to claim 1 wherein said increased thickness is localized on both said outer tubular second layer and said inner tubular first layer.

6. Reinforced flexible hose according to claim 1 wherein at least one of said first and said second layer is colored with different pigmentations along different parts of its length to provide longitudinal portions of said layers with different colors.

7. Reinforced flexible hose according to claim 6 wherein said second layer is provided with a change of coloring and pigmentation in correspondence of the stepped thickness increase to identify where the hose is to be cut.

8. Reinforced flexible hose according to claim 1 wherein said hose comprises one or more further inner, outer or middle tubular layers, made of plastic material, having technical and/or aesthetic functions.

9. Reinforced flexible hose according to claim 8 wherein said one or more further plastic material layers are chosen from the group comprising food compatible, anti-abrasives, UV shielding and ornamental films.

* * * * *